United States Patent
Shahinpoor

[11] Patent Number: 5,821,664
[45] Date of Patent: Oct. 13, 1998

[54] FIBROUS PARALLEL SPRING-LOADED SHAPE MEMORY ALLOY REBOTIC LINEAR

[76] Inventor: Moshen Shahinpoor, 9910 Tanoan Dr. N.E., Albuquerque, N. Mex. 87111

[21] Appl. No.: 829,535

[22] Filed: Mar. 28, 1997

Related U.S. Application Data

[60] Provisional application No. 60/014,349 Mar. 28, 1996.

[51] Int. Cl.$^6$ .................................................. H02N 10/00
[52] U.S. Cl. ............................................ 310/307; 148/402
[58] Field of Search ............................... 148/402; 310/307

[56] References Cited

U.S. PATENT DOCUMENTS

| | | | |
|---|---|---|---|
| 2,722,613 | 11/1955 | Culbertson et al. | 310/307 |
| 2,729,756 | 1/1956 | Euler et al. | 310/307 |
| 4,840,346 | 6/1989 | Adnyana et al. | 251/1.3 |
| 4,848,653 | 7/1989 | Van Becelaere | 236/49.3 |
| 5,127,228 | 7/1992 | Swenson | 60/527 |
| 5,150,770 | 9/1992 | Secci | 185/40 R |
| 5,344,506 | 9/1994 | De Angelis | 148/402 |
| 5,539,854 | 7/1996 | Jones et al. | 392/403 |
| 5,542,434 | 8/1996 | Imran et al. | 128/772 |
| 5,584,843 | 12/1996 | Wulfman et al. | 606/159 |
| 5,613,634 | 3/1997 | Veronesi et al. | 236/101 R |
| 5,642,774 | 7/1997 | Christenson | 165/82 |

*Primary Examiner*—Thomas M. Dougherty
*Attorney, Agent, or Firm*—Milton D. Wyrick

[57] ABSTRACT

Shape memory alloy actuators comprising at least one hollow helical spring with an array of parallel shape memory alloy wires enclosed within or parallel and attached to each of the at least one hollow helical springs. Insulative end caps are attached to end of the at least one hollow helical springs, the insulative end caps defining electrodes for conducting electricity to the arrays of parallel shape memory alloy wires. Voltage means are connected to the electrodes for selectively providing electrical energy to the parallel array of shape memory alloy wires, causing the parallel array of shape memory alloy wires to expand and contract, providing either motion or measurement functions. In one embodiment, at least three helical springs with an array of parallel shape memory alloy wires either enclosed within or situated in physical and electrical contact with each of the at least three helical springs are enclosed within the insulative end caps and are individually actuated to provide three-dimensional movement to the insulative end caps.

10 Claims, 6 Drawing Sheets

FIBROUS PARALLEL SPRING-LOADED SHAPE MEMORY ALLOY REBOTIC LINEAR

This application claims the benefit of U.S. Provisional Application No. 60/014,349 filed Mar. 28, 1996.

The present invention generally relates to shape memory actuators and, more specifically to electrically controlled shape memory alloy wires either enclosed by or in parallel with springs.

Shape memory alloy (SMA) materials are well known, and have been in use for decades. SMAs are alloys which undergo a crystalline phase transition upon applied temperature and/or stress variations. In normal conditions, the transition from an SMA's high temperature state, austenite, to its low temperature state, martensite, occurs over a temperature range which varies with the composition of the alloy, itself, and the type of thermal-mechanical processing by which it was manufactured.

When stress is applied to a SMA member in the austenite phase, and the member is cooled through the austenite to martensite transition temperature range, the austenite phase transforms to the martensite phase, and the shape of the SMA member is altered because of the applied stress. Upon the application of heat, the SMA member returns to its original shape when it transitions from the martensite phase to the austenite phase.

SMAs have been applied to such items as actuators for control systems, steerable catheters, robots, clamps and fasteners. However, SMA materials have not gained wide acceptance in the robotic or intelligent manufacturing areas because of problems associated with reversible actuation which has limited their applicability in these areas. These problems generally have been associated with heat transfer. When the temperature of SMA materials is raised, either by passing an electrical current through the material or by direct heating, the length of the material, for example, either shrinks or expands. Subsequently, after removal of the heat application, the SMA material gradually will revert to its original length when the temperature of the SMA material and its surroundings are at the original temperature. This heat transfer process is generally a relatively slow process, especially in bulky bodies.

Although the original SMA materials could be classed as bulky bodies, recently, thin SMA wires have been developed. With direct resistive heating and rapid cooling, these SMA wires can expand or shrink and return to their original length. This has allowed the construction of spring-loaded SMA actuators with acceptable response times and short time-duration reversibility. The present invention applies these SMA wires to novel SMA actuators involving a parallel array of SMA wires between sandwiched between two parallel end caps and engulfed by helical compression springs or in parallel with an array of parallel springs. These novel SMA actuators hereinafter will be more particularly described.

It is therefore an object of the present invention to provide shape memory alloy linear actuators for use in robotics.

It is another object of the present invention to provide shape memory alloy linear actuators which can quickly expand or shrink from an original length and return quickly to the original length.

It is still another object of the present invention to provide shape memory alloy linear actuators which will allow precise control for robotic movement.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, there is provided a shape memory alloy actuator comprising at least one hollow helical spring with shape memory alloy wire enclosed within the at least one hollow helical spring. Insulative end caps restrain the at least one helical spring and define electrically conductive electrodes for conducting electricity to the shape memory alloy wire.

In another aspect of the present invention and in accordance with its purposes and objects, a shape memory alloy actuator comprises at least one helical spring with shape memory alloy wire situated in physical and electrical contact with the entire length of the at least one helical spring. Insulative end caps restrain the at least one helical spring and define electrically conductive electrodes for conducting electricity to the shape memory alloy wire.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

The present invention provides shape memory alloy actuators which utilize helical springs having either shape memory alloy wire enclosed inside the springs, or shape memory alloy wire attached in parallel with the springs. With the application of an electrical potential and/or heat, the shape memory alloy wires will cause the helical springs to either elongate or withdraw, causing whatever is attached to the springs to move in a desired direction. The invention can be understood most readily through reference to the drawings.

Figure 1:
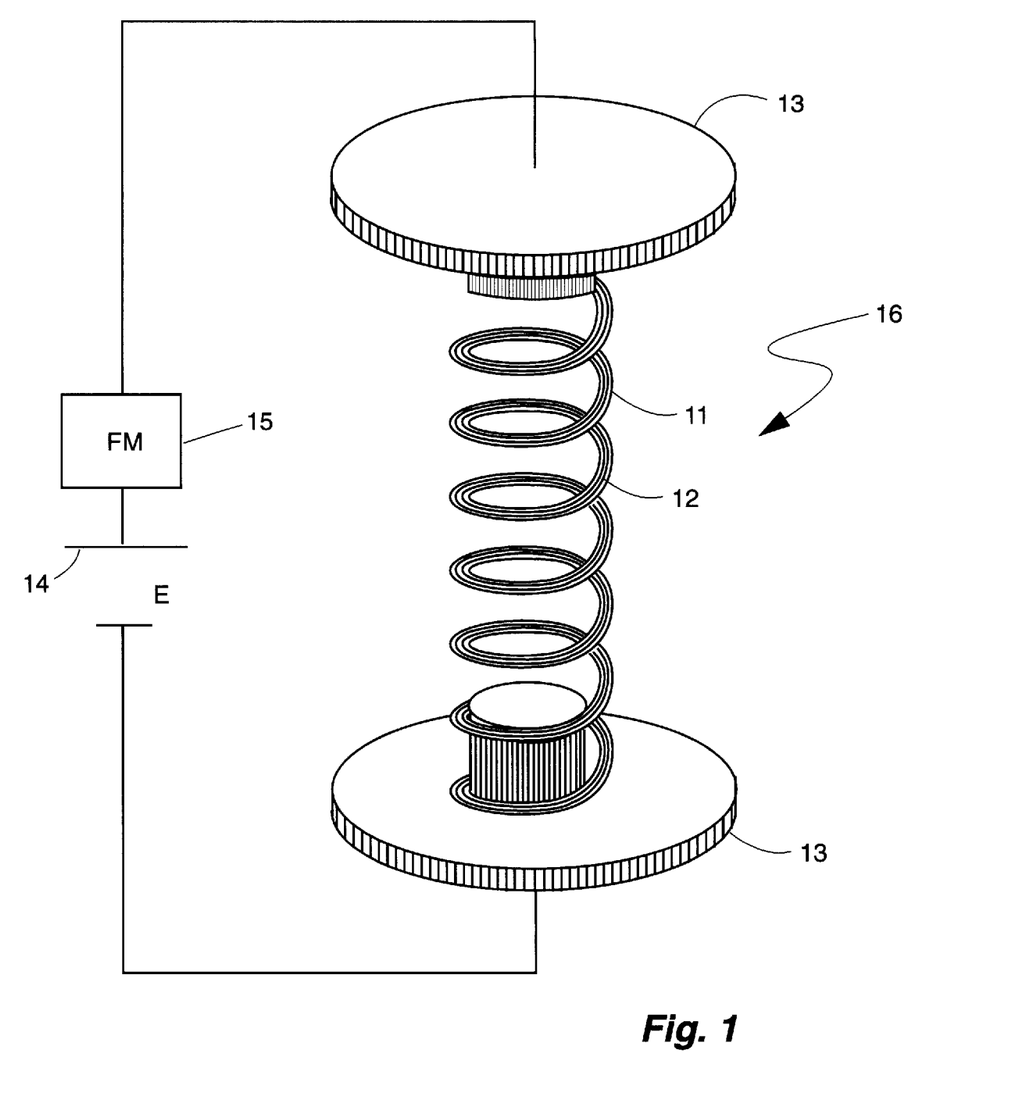
FIG. 1 is a perspective illustration of one embodiment of the present invention showing a single hollow helical spring enclosing shape memory alloy wire inside.

Referring now to FIG. 1, there can be seen helical spring 11 with an array of parallel shape memory alloy wires 12 attached along its length. Helical spring 11 is retained between end caps 13. End caps 13 are insulative, but contain electrodes (not shown) which contact helical spring 11 and shape memory alloy wires 12. Voltage source 14 is connected to the electrodes, and shape memory alloy wires 12 through control circuitry 15. Shape memory alloy wires 12 act as a resistance in the electrical circuit of FIG. 1 involving voltage source 14 control circuitry 15 and shape memory alloy wires 12 and forming what will hereinafter be referred to as SMA actuator 16. Shape memory alloy wires 12 may be any shape memory alloy wires such as NITINOL® wires.

With voltage source 14 connected to shape memory alloy wires 12 through control circuitry 15, resistive heating will occur in shape memory alloy wires 12 causing it contract due to its resulting higher temperature. It should be noted, that shape memory alloy wires 12 could also expand upon higher temperatures, if it is so memory trained.

Figure 2:
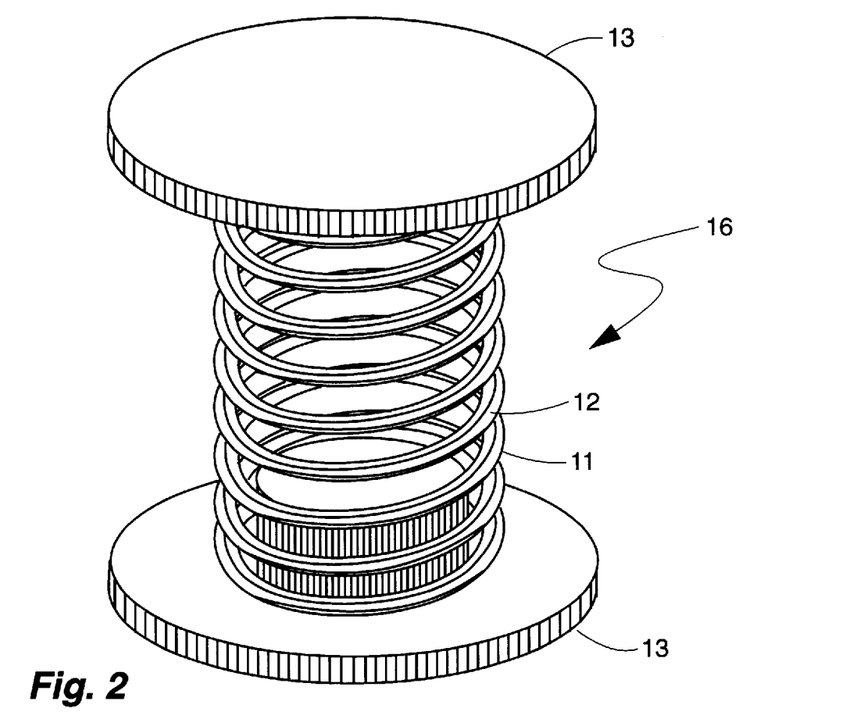
FIG. 2 is a perspective illustration of another embodiment of the present invention in which shape memory alloy wire is in physical and electrical contact with a helical spring.

However, assuming contraction is the mode of separation of shape memory alloy wires 12, helical spring 11 and shape memory alloy wires 12 are assembled in such a way that, at room temperature, shape memory alloy wires 12 is stress-free and helical spring 11 is in its natural state, as shown in FIG. 1. Then, with resistive heating, helical spring 11 and shape memory alloy wires 12, which were originally at a temperature, $T_0$, the distance between end caps 13 will decrease as soon as shape memory alloy wires 12 reach the martensitic-austenitic phase transition temperature, $T_A$, to a final compressed state as illustrated in FIG. 2.

Figure 3:
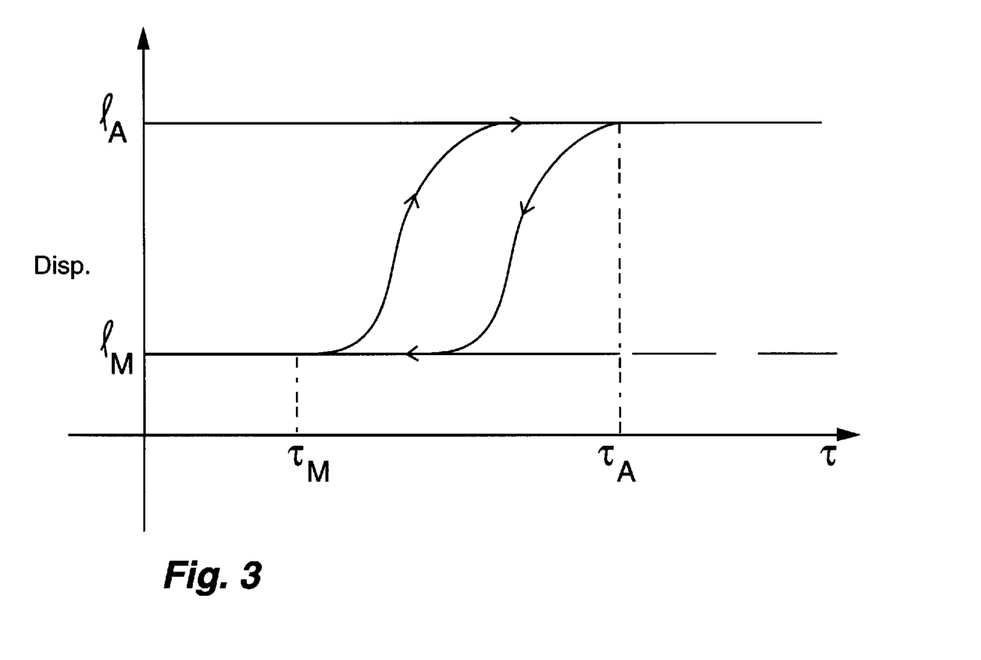
FIG. 3 is an illustration of the displacement temperature response of shape memory alloy wires in arbitrary units.

FIG. 3 illustrates the displacement temperature response of shape memory alloy wires 12 in arbitrary units. As seen, for this example, shape memory alloy wires 12 is unchanged from length, $1_M$, until it reaches temperature, $T_M$, its matensitic temperature. At this point, expansion of shape memory alloy wires 12 begins and continues to length, $1_{M'}$, at temperature, $T_A$, its austenitic temperature. As cooling occurs, shape memory alloy wires 12 returns to its original length, $1_M$. The heated area within the curves of FIG. 3 is related to the heat loss from shape memory alloy wires 12. Thus direct electrical voltage or current control of the deformation of SMA actuator 16 is possible.

Figure 4:
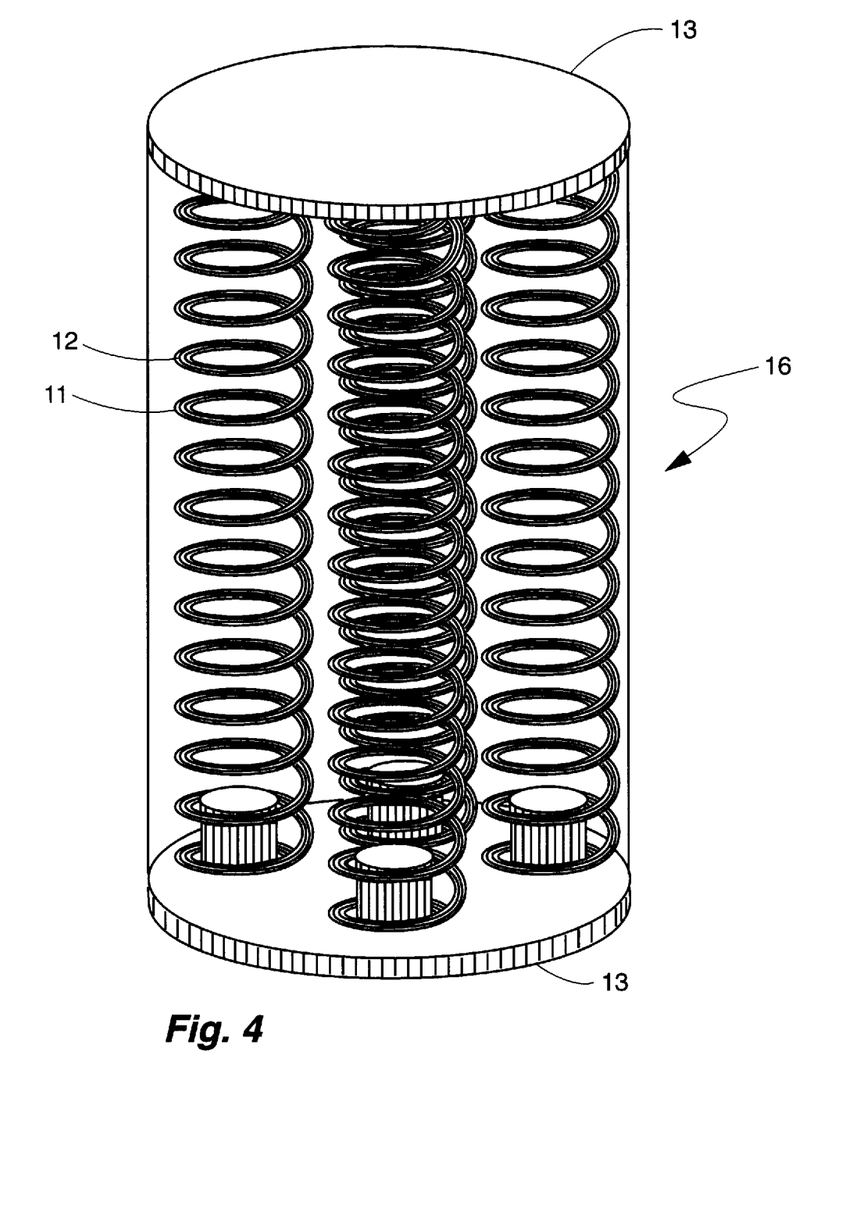
FIG. 4 is a perspective illustration of still another embodiment of the present invention in which a plurality of hollow helical springs each enclose a shape memory alloy wire.

FIG. 4 illustrates an embodiment of SMA actuator 16 which is made up a plurality of helical springs 11 with a like plurality of shape memory alloy wires 12. This embodiment could be useful when a particular application calls for more a heavier duty SMA actuator 16. Another useful feature of this embodiment is that it can be used to create a tilting and rotating platform robot or robotic wrist if individual helical springs 11 and shape memory alloy wires 12 are selectively actuated so as to create three-dimensional movement of end caps 13.

Figure 5:
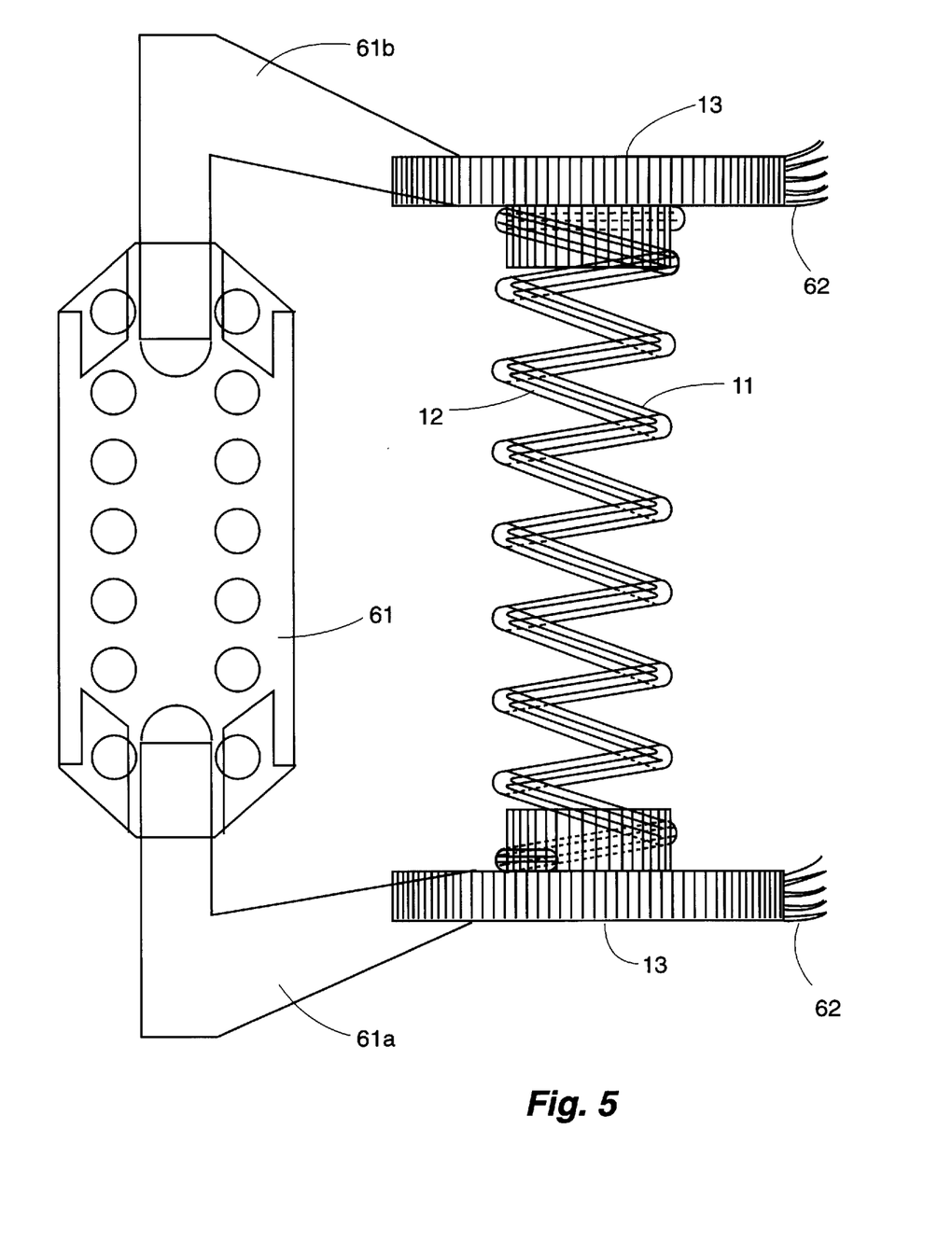
FIG. 5 is a schematical illustration of an embodiment of the invention in which control circuitry is combined into a module and one-way cilia are attached to the end caps.

Reference should now be made to FIG. 5. Here, the same principles described hereinabove can be applied to the illustrated embodiment In this embodiment, with voltage source 14 and control circuitry 15 (FIG. 1) are combined into control module 61 which is connected to each end of helical spring 11 and shape memory alloy wires 12 through leads 61a, 61b. As shown, one-way motion cilia 62 are attached to end caps 13. With the repeated expansion and contraction of helical spring 11 and shape memory alloy wires 12, this embodiment will move in the direction allowed by one-way motion cilia 62, allowing the creation of robotic annelids.

Figure 6:
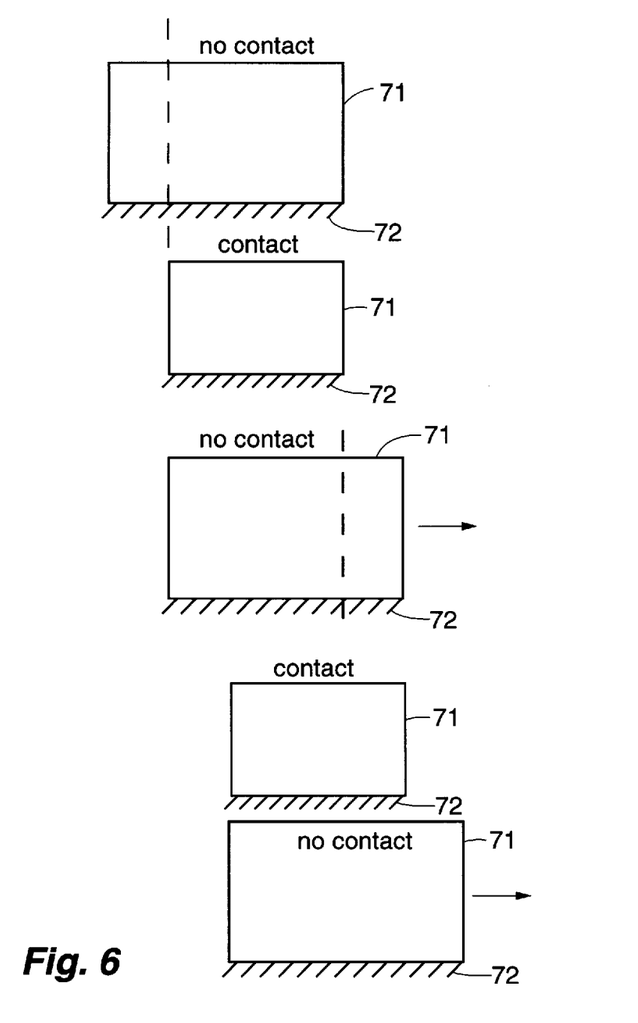
FIG. 6 is an illustration of the movement of a box with actuators with one-way cilia providing motion with alternating application and disconnection of voltage to the SMA wires.

This one direction movement is illustrated in FIG. 6 for box 71 with one-way cilia 72 attached to its bottom, representing an application of the robotic annelid embodiment of the invention illustrated in FIG. 6. With no electrical contact at a, box 71 is at rest with a length as shown. With electrical contact at b, box 71 compresses to the length shown. With electrical contact being broken, box 71 returns to its original length, but moves a distance in the direction shown at c. At d, box 71 again regains electrical contract and contracts. With the disconnection of electrical contact at e, box 71 again expands to its original length and moves in the direction shown.

Figure 7:
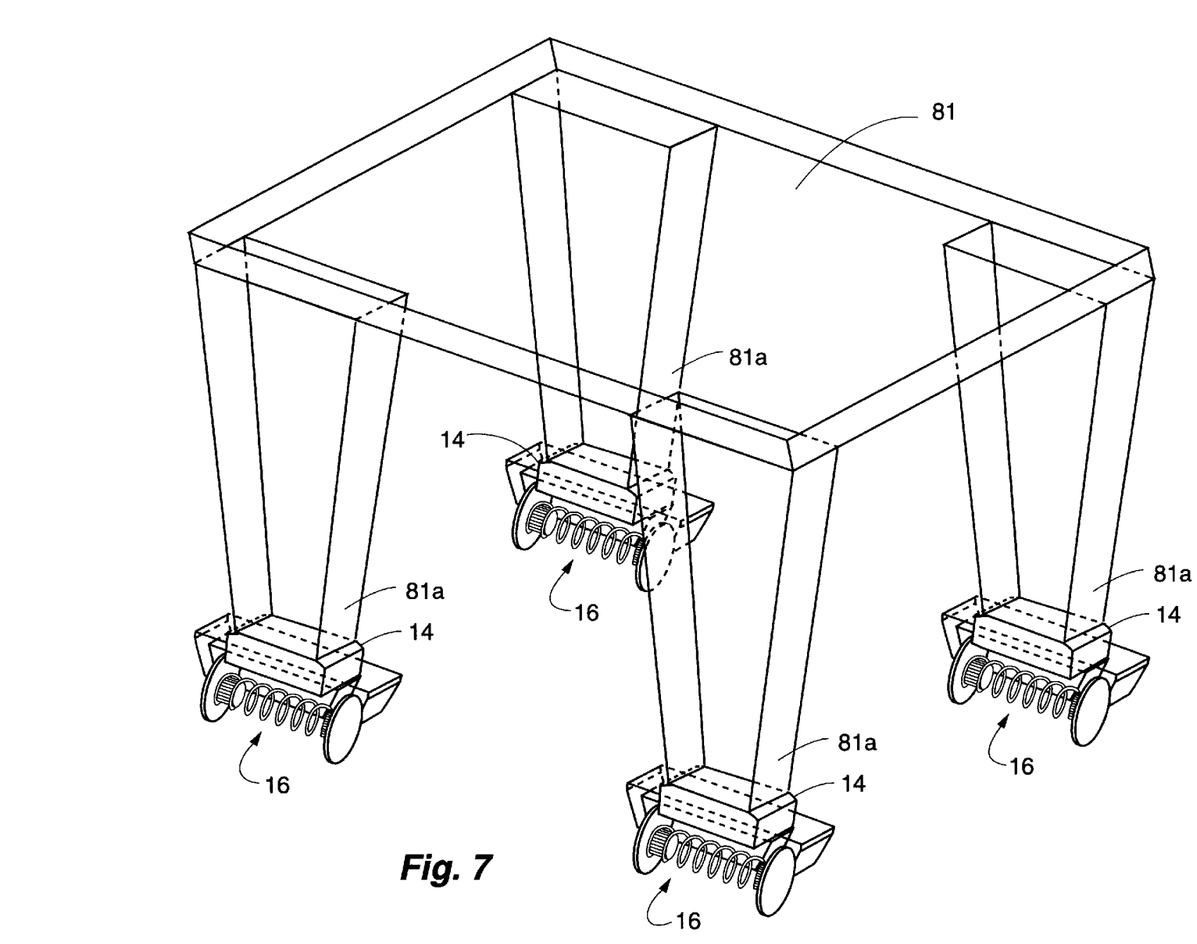
FIG. 7 is a perspective view of a moving table with actuators as illustrated in FIG. 5 attached to its legs.

In FIG. 7, an application of the present invention to moving table 81 is illustrated. As shown, each leg 81a of table 81 has the robotic annelid embodiment of SMA actuator 16 illustrated in FIG. 5 attached to its end. This allows table 81 to move in a desired direction with the application and disconnection of voltage source 14.

The present invention could also be used to control the movement of pulleys to actuate movement of robots. In this use, shape memory alloy wire 12 is associated with a torsional spring in the manner taught herein, either in enclosed within the hollow spring, or attached in parallel to the spring. The combination of shape memory alloy wire 12 and torsional spring is wrapped around the cylindrical body of a pulley, the expansion and contraction of shape memory alloy wire providing the movement of the pulley.

The ability of shape memory alloy wire 12 to expand and contract lends it to many applications such as a way to measure fluid velocity, temperature, convection heat transfer coefficients, and other thermo-mechanical parameters by correlating to the length change or rotation of the actuators of the present invention. One important application would be the direct wind velocity measurements at constant temperature. Further, the actuators according to the present invention can be used as a heat transfer probe to measure the rate of heat transfer by convection for different fluids, gases and liquids.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A shape memory alloy actuator comprising;
    at least one hollow helical spring;
    an array of parallel shape memory alloy wires enclosed within each of said at least one hollow helical springs;
    insulative end caps attached to each end of each of said at least one helical springs, said insulative end caps defining electrodes for conducting electricity to said arrays of parallel shape memory alloy wires;
    voltage means connected to said electrodes for selectively providing electrical energy to said parallel array of shape memory alloy wires, causing said parallel array of shape memory alloy wires to expand and contact.

2. The shape memory alloy actuator as described in claim 1, wherein said at least one helical spring comprises one spring.

3. The shape memory alloy actuator as described in claim 1, further comprising one-way cilia attached to said insulative end caps.

4. The shape memory alloy actuator as described in claim 1, wherein said array of parallel shape memory alloy wires comprise NITINOL® wires.

5. The shape memory alloy actuator as described in claim 1, wherein said at least one helical spring comprises at least three helical springs with an array of parallel shape memory alloy wires enclosed within each of said at least three helical springs said at least three helical springs and said array of parallel shape memory alloy wires being individually actuated to provide three-dimensional movement to said insulative end caps.

6. A shape memory alloy actuator comprising:

at least one helical spring;

an array of parallel shape memory alloys wires situated in physical and electrical contact with each of said at least one helical spring;

insulative end caps attached to each end of each of said at least one helical springs, said insulative end caps defining electrically conductive electrodes for conducting electricity said arrays of shape memory alloy wires; and voltage means connected to said electrodes for selectively providing electrical energy to said parallel array of shape memory alloy wires, causing said parallel array of shape memory alloy wires to expand and contact.

7. The shape memory alloy actuator as described in claim 6, wherein said at least one helical spring comprises one spring.

8. The shape memory alloy actuator as described in claim 6, further comprising one-way cilia attached to said insulative end caps.

9. The shape memory alloy actuator as described in claim 6, wherein said array of parallel shape memory alloy wires comprise NITINOL® wires.

10. The shape memory alloy actuator as described in claim 6, wherein said at least one helical spring comprises at least three helical springs with an array of parallel shape memory alloy wires situated in physical and electrical contact with each of said at least three helical springs said at least three helical springs and said array of parallel shape memory alloy wires being individually actuated to provide three-dimensional movement to said insulative end caps.

* * * * *

UNITED STATES PATENT AND TRADEMARK OFFICE
CERTIFICATE OF CORRECTION

PATENT NO. : 5,821,664
DATED : October 13, 1998
INVENTOR(S) : Mohsen Shahinpoor

It is certified that error appears in the above-identified patent and that said Letters Patent is hereby corrected as shown below: On the title page: Item [54]

"FIBROUS PARALLEL SPRING-LOADED SHAPE MEMORY ALLOY REBOTIC LINEAR" should read -- FIBROUS, PARALLEL SPRING-LOADED SHAPE MEMORY ALLOY ROBOTIC LINEAR ACTUATORS --; and Item [75] "MOSHEN" should read -- MOHSEN --.

Column 1 in the title, "FIBROUS PARALLEL, SPRING-LOADED SHAPE MEMORY ALLOY REBOTIC LINEAR" should read -- FIBROUS, PARALLEL SPRING-LOADED SHAPE MEMORY ALLOY ROBOTIC LINEAR ACTUATORS --; and In column 1, line 6, the government paid-up license in this invention is acknowledged by inserting the following:

-- GOVERNMENT RIGHTS

The U.S. Government has a paid-up license in this invention and the right in limited circumstances to require the patent owner to license others on reasonable terms as provided for by the terms of Contract No. DE-AC04-94AL85000 awarded by the United States Department of Energy. --

Signed and Sealed this

Fourth Day of January, 2000

Attest:

Attesting Officer

Acting Commissioner of Patents and Trademarks